E. A. SLYE.
REGISTER.
APPLICATION FILED SEPT. 13, 1917.
1,261,449.
Patented Apr. 2, 1918.
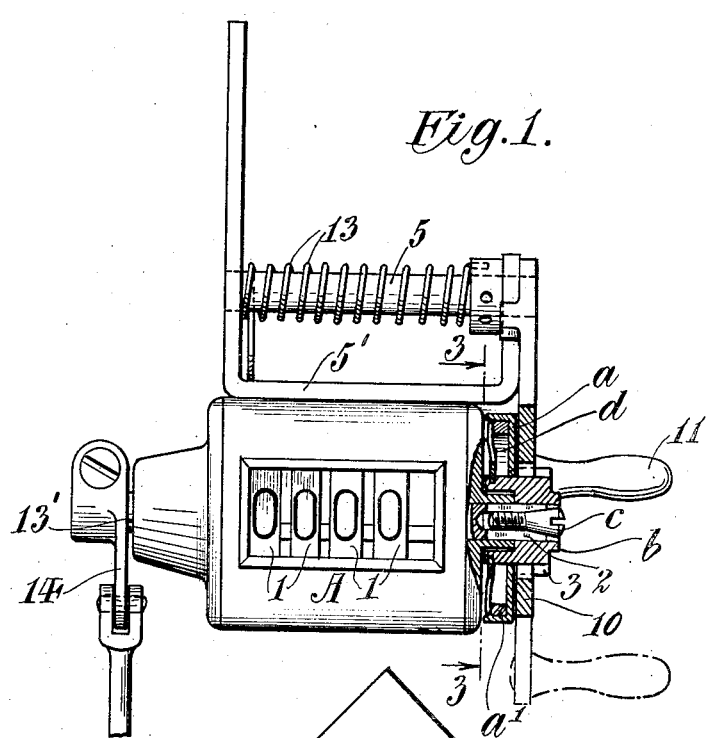
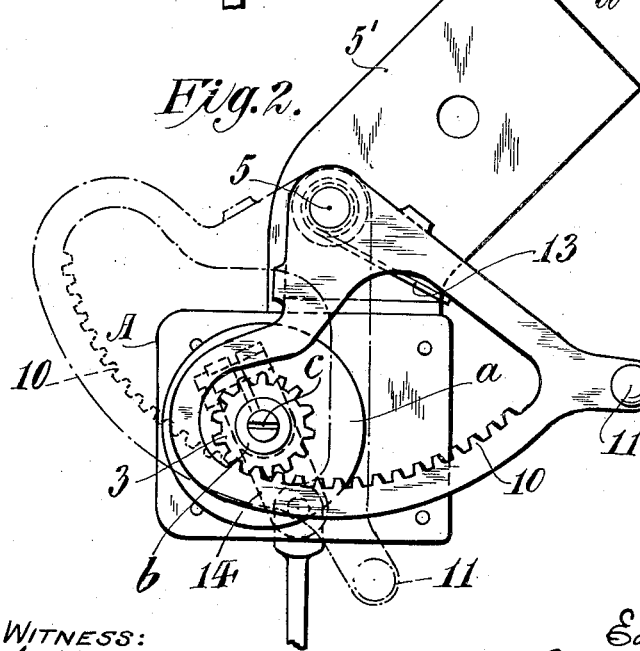
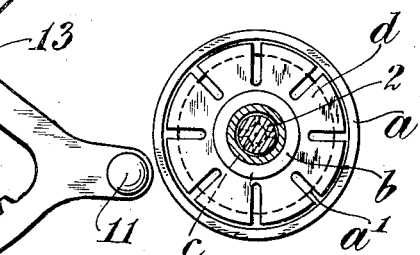
WITNESS:
INVENTOR
Edward A. Slye
BY
Redding, Greeley & Goodlett
ATTORNEYS

UNITED STATES PATENT OFFICE.

EDWARD A. SLYE, OF HARTFORD, CONNECTICUT, ASSIGNOR TO THE VEEDER MANUFACTURING COMPANY, OF HARTFORD, CONNECTICUT, A CORPORATION OF CONNECTICUT.

REGISTER.

1,261,449.  Specification of Letters Patent.  Patented Apr. 2, 1918.

Application filed September 13, 1917. Serial No. 191,117.

*To all whom it may concern:*

Be it known that I, EDWARD A. SLYE, a citizen of the United States, and residing in the city of Hartford, in the State of Connecticut, have invented certain new and useful Improvements in Registers, of which the following is a specification, reference being had to the accompanying drawings, forming a part hereof.

In registers or counting devices which are provided with means for resetting the number wheels to zero after a series of operations, quick acting means for actuating the resetting devices are sometimes provided, such actuating devices being operated in one direction by hand and returned to normal position by springs. If the operating spring is lively it sometimes happens that the actuating devices rebound slightly and produce a movement of the number wheels sufficient to carry the wheels slightly beyond the true zero position. It is the object of this invention to provide means whereby such movement of the wheels beyond the true zero position by the rebound of the actuating devices shall be prevented. To this end a brake is applied to the resetting mechanism at the end of the return movement of the actuating means to prevent movement of the wheels from the zero position and the rebound of the actuating means. Preferably the brake takes the form of a momentum disk on the resetting shaft and in frictional engagement therewith so that its momentum, when it has been set in motion by the quick return of the actuating means under the influence of the spring, opposes the tendency of the wheels to move under the influence of the rebound of the actuating means and prevents such rebound. The invention will be more fully explained hereinafter with reference to the accompanying drawings in which a convenient and practical embodiment of the invention is illustrated and in which,—

Figure 1 is a top view, partly in axial section, of a register of usual construction, to which the invention is applied.

Fig. 2 is a view of the same in end elevation as seen from the right hand in Fig. 1.

Fig. 3 is a detail view in section on the plane indicated by the line 3—3 of Fig. 1, looking in the direction of the arrows, showing particularly the momentum disk and the friction spring.

The invention is illustrated in the drawing as applied to a register A, of well known construction, in which a series of number wheels or rings 1 are mounted side by side upon a common axis, the operating shaft 13' being oscillated by an arm 14 fast on the shaft and driving the number wheels with a step by step motion in the usual manner. In this register the resetting of the number wheels to zero, after a series of operations, is effected in a well known manner by the rotation of the resetting shaft 2 through a complete rotation or nine-tenths of a complete rotation. The resetting shaft is shown as provided, outside of the casing of the register, with a pinion 3 which is engaged by a segmental rack 10 secured to a shaft 5, mounted in bearings in a bracket 5' secured to the casing of the register, and provided with a finger piece or handle 11 by which the segmental rack may be moved by the operator in one direction to cause the register of the number wheels to zero. The segmental rack is returned to its initial position, in readiness for another operation, by a spring 13. It will be understood that the movement of the segmental rack by the operator is an effective movement and that the movement by the spring is an idle movement. It will also be understood that if there is any rebound of the segmental rack, after the return movement by the spring, such rebound, being in the same direction as that of the effective movement by the operator, would tend to move the number wheels in the same direction in which they are moved by the operator and therefore to carry the zero characters slightly beyond the true zero position. To prevent such undesired movement of the number wheels and the rebound of the actuating means, provision is made whereby the tendency of the wheels to turn under the influence of a rebound of the actuating mechanism is opposed.

In the embodiment of the invention illustrated there is frictionally mounted on the resetting shaft 2 a momentum disk *a*. This is conveniently accomplished by securing a hub $b$ to the resetting shaft 2 by means of a screw $c$, mounting the momentum disk loosely on the hub $b$, and securing to the hub a spring friction plate $d$ which bears frictionally upon the momentum disk $a$ or, as shown in the drawing, upon a ring $a'$ secured to the momentum disk. It will now be seen that although the momentum disk is not fixed to the resetting shaft and its momentum therefore causes no hammering action on the somewhat delicate mechanism of the register, its continued movement after the movement of the resetting shaft has ceased, applies, through its frictional engagement with the resetting shaft, a braking action which opposes and prevents any tendency of the actuating means to rebound and of the shaft and pinion to turn under the influence of such rebound.

It will be understood that the invention is capable of application to registers of other constructions than that indicated in the drawings and that its structural embodiment will be varied more or less to suit different conditions of use.

I claim as my invention:

1. The combination with the number wheels of a register, resetting devices therefor, and quick acting actuating means for the resetting devices, of means to apply a braking action to the resetting devices at the end of the return movement of the actuating devices to prevent rebound of the actuating devices and movement of the number wheels from the true zero position.

2. The combination with the number wheels of a register, resetting devices therefor, and quick acting actuating means for the resetting devices, of a momentum disk in frictional engagement with the resetting devices to prevent rebound of the actuating devices and movement of the number wheels from the true zero position.

This specification signed this 11 day of September, A. D. 1917.

EDWARD A. SLYE.